United States Patent [19]

Hindin et al.

[11] 3,993,572

[45] Nov. 23, 1976

[54] RARE EARTH CONTAINING CATALYST COMPOSITION

[75] Inventors: Saul G. Hindin, Mendham; Joseph C. Dettling, Jackson, both of N.J.

[73] Assignee: Engelhard Minerals & Chemicals Corporation, Murray Hill, N.J.

[22] Filed: Dec. 10, 1973

[21] Appl. No.: 423,092

Related U.S. Application Data

[63] Continuation-in-part of Ser. No. 278,084, Aug. 4, 1972, abandoned.

[52] U.S. Cl. .............................. 252/462; 423/213.5
[51] Int. Cl.² .................... B01J 23/10; B01J 21/04
[58] Field of Search .................... 252/462, 466 PT; 423/213.2, 213.5

[56] References Cited
UNITED STATES PATENTS

| | | | |
|---|---|---|---|
| 3,259,453 | 7/1966 | Stiles | 423/213.7 |
| 3,271,324 | 9/1966 | Stephens et al. | 252/466 B |
| 3,322,491 | 5/1967 | Barrett et al. | 252/462 X |
| 3,483,138 | 12/1969 | Stephens | 252/462 |
| 3,545,917 | 12/1970 | Stephens | 252/462 X |
| 3,615,166 | 10/1971 | Hindin et al. | 252/466 PT |
| 3,741,725 | 6/1973 | Graham | 423/213.2 |
| 3,776,859 | 12/1973 | Simpson | 252/462 |
| 3,899,444 | 8/1975 | Stephens | 252/462 |
| 3,903,020 | 9/1975 | Sergeys et al. | 252/462 |

*Primary Examiner*—W. J. Shine

[57] ABSTRACT

Catalysts suitable for promoting selected oxidation and reduction reactions; especially for eliminating or substantially reducing pollutants in waste gas streams such as automobile exhaust, or nitric acid plant tail gas, are described, as are processes for their preparation and use. The catalysts contain platinum group metal, rare earth metal and alumina components which may be supported on relatively catalytically inert carriers, for instance, honeycombs. The catalysts can be prepared, for example, by pre-calcining a mixture of alumina and rare earth metal oxide, e.g., ceria, at a temperature of at least about 750° C. to obtain a catalytically-active material; coating a relatively inert support, if such is used, with an aqueous slurry of the calcined material; calcining the composite, adding platinum group metal thereto and drying.

5 Claims, No Drawings

RARE EARTH CONTAINING CATALYST COMPOSITION

This application is a continuation-in-part of our application Ser. No. 278,084, filed Aug. 4, 1972 and now abandoned.

The present invention relates to catalytic compositions and methods for their preparation and use. More particularly, this invention relates to compositions having initial high catalytic activity and the ability to withstand high temperatures while maintaining good activity in selected reactions over long periods of use. Such catalysts are thus capable of reducing pollutants in waste gases. For example, these catalysts may be used for the oxidation of carbonaceous materials in automobile exhaust as well as the reduction of nitrogen oxides ($NO_x$) contained in nitric acid production waste gas.

The majority of conventional chemical processes and methods of producing power utilizing chemical fuels produce quantities of undesirable by-products. In some instances these by-products in gaseous form are simply vented to the atmosphere. Such practices produce serious pollution problems, and methods of reducing harmful by-products without unduly limiting the process or system are extremely advantageous.

It is well known that when carbonaceous fuels are burned by conventional processes to produce power, for example, in reciprocating piston engines, rotary engines, turbines, and the like, combustion is generally incomplete. The exhaust gases from these power producing systems contain a mixture of pollutants including carbon monoxide, hydrocarbons (saturated and unsaturated), and oxygenated organic compounds such as aldehydes, organic acids, and the like. Such exhaust is frequently allowed to enter the atmosphere. It is also known that certain chemical processes produce waste gases containing oxides of nitrogen, e.g., $NO_2$ (often referred to as $NO_x$). Venting such waste streams to the atmosphere constitutes a serious air pollution problem. This problem is particularly acute in the manufacture of nitric acid by ammonia oxidation since it is difficult to convert all the oxides of nitrogen to nitric acid and a significant quantity of such oxides is present in the waste or tail gases. Elimination or substantial reduction of the undesirable byproducts in both of these situations, as well as innumerable other situations, is thus seen to be extremely desirable.

Catalysis has been used in both of the above-described cases in an attempt to alleviate such pollution problems. For example, in the first case where exhaust from power producing systems is considered, catalytic oxidation provides a means of curtailing the content of oxidizable materials in these exhaust gases. This can be accomplished through an oxidation reaction by contacting the gases with oxygen in the presence of catalysts. The catalysts are usually placed in the exhaust line leading from the combustion zone and serve to promote reaction between free oxygen and uncombusted and partially combusted fuel components. The oxygen is typically derived either from fuel-lean operation of the combustion zone in which case it will be inherently present in the exhaust gas or from an external air or other oxygen supply. A common deficiency of such catalysts is a significant decrease in activity when they are used at elevated temperatures for long periods of time. This decrease in activity is due, in part, to a structure that tends to sinter at high temperatures, thus reducing the available surface area of the catalysts. Further, thermal degradation and loss of strength of the catalyst resulting from extended exposure to the high exhaust gas temperatures of power producing systems may cause attrition of the catalyst body. This problem is especially evident when a catalyst is employed in a moving vehicle where the exhaust temperature is frequently above 1000° F. and the catalyst is subjected to a considerable vibration. Erosion of finely divided particles of catalyst or other structural degradations thus produced reduce the effectiveness of the catalyst. Further, many catalysts for treating exhaust gases lack specificity, and while they may give satisfactory results for carbon monoxide conversion, frequently provide relatively poor conversion of hydrocarbons. Another problem which must be overcome is the provision of an oxidation catalyst which retains its effectiveness over a relatively long period of time, for example, when used for vehicle exhaust, for about 50,000 miles of vehicle operation. If frequent removal and replacement of the catalyst are required to maintain the desired activity, the cost of such a catalytic pollution abatement system becomes burdensome. Additionally, since significantly high amounts of hydrocarbons, carbon monoxide, and other partially combusted materials are produced in exhaust gas during the initial moments of start-up when the combustion zone is at a relatively low temperature, a satisfactory catalyst for exhaust gas oxidation must operate efficiently at such low temperatures.

In the second case, waste gas producing chemical processes are considered. For example, purification of nitric acid tail gas streams can be accomplished by catalytic treatment of the gas in the presence of a reducing fuel to decolorize or reduce the noxious constituents. Substantial elimination of such constituents is, of course, more difficult than mere decolorization of the stream.

Many processes using a reducing fuel have been proposed for the catalytic purification of waste gas streams. Such purification is generally accomplished in one or more reduction stages to control temperature rise. Reducing fuels useful for these processes are, for example, hydrocarbons such as methane and natural gas; gasoline boiling range hydrocarbons, especially those of relatively low octane ratings; $NH_3$; $H_2$; CO; and the like. Methane and natural gas are often used because of their availability and relatively low cost. The design requirements of catalysts for such processes depend on various parameters such as the amount of $NO_x$ in the gas stream, the amount of oxygen in the stream, and the amount of fuel used as well as gas temperature, pressure, and space velocity. These requirements are critical and desirably include catalytic activity at relatively low ignition temperatures as well as satisfactory catalyst life and efficiency. There are two major competing reactions involved in these processes, i.e., fuel combustion and reduction of $NO_x$; efficiencies and activities for both of these reactions are interdependent. Efficiency of the catalyst can be expressed as a ratio of $NO_x$ removal to oxygen removal. The catalyst activity is roughly equivalent to its efficiency. Additionally, a lower ignition temperature for the purification process is indicative of a catalyst with higher activity. Catalysts containing platinum group metals have been found most effective in these processes, particularly with regard to providing the required activity. These platinum group metals have been supported on various carriers, e.g., activated alumina and the catalyst compositions may vary with, for example, the fuel and process conditions. An example of a catalyst that has been used is for nitric acid tail gas streams, supported rhodium or palladium with methane as the reducing fuel. This catalyst has been found to ignite the methane at relatively low temperatures. While many of the catalytic abatement systems for treating waste gas streams such as nitric acid plant tail gas have been useful, many of them have not been entirely satisfactory. A particularly difficult problem is that regardless of initial activity the catalysts are often too readily deactivated, first becoming increasingly less effective for the removal of oxides of nitrogen, and eventually ineffective for promoting combustion of the fuel added.

According to the present invention it has been discovered that a novel composition consisting essentially of a catalytically-active, pre-calcined mixture of rare earth metal oxide and alumina and a catalytically-effective amount of platinum group metal, wherein the mixture is calcined preferably in air at a temperature of at least 750° C. before addition of the platinum group metal is an excellent catalyst for substantially eliminating pollutants in the exhaust streams of chemically fueled power producing systems and selected chemical processes. Such substantial elimination is accomplished by the catalysts of this invention with the added advantages of good structural integrity, high temperature stability, good practical life, and retention of activity for extended periods in the reactions with which they are used.

Broadly, the catalysts of this invention have a catalytically-active, pre-calcined mixture of rare earth metal oxide and alumina to which is added a platinum group metal. The pre-calcination is conducted at temperatures of at least about 750° C., preferably at about 900° to 1200° C. but not high enough or long enough to unduly sinter the material. The calcination is performed before the addition of platinum group metal to the rare earth metal oxide and alumina-containing mixture, to avoid having the platinum group metal component occluded by sintering of the mixture. The precalcined material generally has a surface area of at least about 25, preferably at least about 75, square meters per gram. The surface areas referred to throughout the specification and claims are as determined by the BET or similar method. While it is not essential, the catalysts preferably have a relatively, catalytically-inert, rigid support which carries the alumina, rare earth metal oxide, and platinum group metal composite. The catalysts can be made in various ways, for instance, the rare earth metal oxide-alumina mixture is pre-calcined and may be applied to an inert support as an aqueous slurry and then the platinum group metal component added, followed by drying of the composite. The pre-calcined mixture may also be formed and then platinum group metal added. In other procedures, the platinum group metal component may be added to the pre-calcined mixture of rare earth metal and aluminum oxides and if desired, the composite can then be deposited on a relatively inert support.

In the catalysts of this invention, the platinum group metals are promoters for oxidation and reduction reactions and are present in amounts sufficient to provide compositions having significant activity for catalyzing these reactions. The platinum group metals are platinum, ruthenium, palladium, iridium, and rhodium. These metals, mixtures, and alloys thereof serve as the platinum group metal of the catalysts of this invention. The choice of metal or metal combinations is governed largely by criteria of specificity, volatility; deactivation by specific components of the exhaust stream and economics.

The quantity of platinum group metal component added depends first on design requirements such as activity and life and second on economics. Theoretically, the maximum amount of such component is enough to cover the maximum amount of surface available without causing undue metal crystallite growth and loss of activity during use. Two major competing phenomena are involved in such surface treatment. It is desirable to completely cover the substrate surface to provide the greatest amount of platinum coverage, thereby obtaining maximum activity, but if the surface were to be completely covered, such coverage would promote growth between adjacent crystallites, which growth would then decrease the surface area and greatly reduce activity. A balance of maximum coverage coupled with proper dispersion thus must be achieved to formulate a practical catalyst. An ancillary consideration in relation to the amount of platinum group metal component is the allowable size of the catalyst housing and the process conditions. If the size is small, the amount of platinum group metal component used is preferably increased within the above-described limits. For example, for automobile exhaust treatment, the allowable size is relatively small, especially if unitary honeycomb type supports are used where a higher loading may be desirable. Economics, of course, dictates the use of the least amount of platinum group metal component possible while accomplishing the main objective of reducing pollutants. Generally, the amount of platinum group metal used is a minor portion of the catalyst composite and typically does not exceed about 20 weight percent of the alumina-rare earth metal oxide carrier. The amount may be about 0.1 to 20% and is preferably about 0.2 to 10% to economically maintain good activity with prolonged use. These percentages are based on the weight of the pre-calcined composite. If the composite is used on an inert substrate, it may be, for example, about 10% of the weight of the substrate and the % weight of platinum in relation to the total weight of substrate and composite will be correspondingly less. When the platinum group metal component of these catalysts contains more than one of such metals, this component may be composed of a major amount of platinum and a minor amount of one or more of the other platinum group metals, such as palladium. For example, the platinum group metal may have about 50 to 95 weight percent platinum and about 5 to 50 weight percent palladium. Palladium is cheaper than platinum and its use in a higher percentage is therefore economically desirable but palladium is more sensitive to sulfur, and it is found in the use of this catalyst in sulfur containing systems that the above percentages produce the best compromise between sustained activity and economics.

The completed catalyst is used at relatively high temperatures and further, during its preparation the catalyst may be heated or calcined at temperatures sufficient to decompose platinum group metal compounds deposited on it. Because of this heating with consequent decomposition and substantial volatilization of undesirable components, any of a number of platinum group metal compounds can be deposited on the catalyst surface. Determination of the type of compound to be used is based largely upon chemical interaction of the compound with the underlying composite. For example, anionic, cationic, and neutral forms of platinum may be produced respectively by $H_2PtCl_6$, $Pt(NH_3)_4Cl_2$, and $Pt(NO_3)_2(NH_3)_2$. During preparation of the catalyst various compounds and/or complexes as well as elemental dispersions of any of the platinum group metals may be used to achieve deposition of the metal on the carrier. Water soluble compounds or complexes, as well as organic soluble compounds or complexes, may be used. The only limitation on the carrier liquids to deposit these compounds, complexes, or elemental dispersions is that the liquids must not react with the platinum group metal compound and must be capable of being removed from the catalyst by volatilization or decomposition by subsequent heating and/or vacuum. It is not critical whether this removal is accomplished as part of the preparation or in the use of the completed catalyst. Suitable compounds are, for example, chloroplatinic acid, potassium platinum chloride, ammonium platinum thiocyanate, platinum tetrammine hydroxide, platinum group metal chlorides, oxides, sulfides, and nitrates, platinum tetrammine chloride, sodium palladium chloride, palladium tetrammine chloride, hexammine rhodium chloride, and hexammine iridium chloride. If a mixture of platinum and palladium is desired, the platinum and palladium may be in water soluble form, for example, as amine hydroxides or as chloroplatinic acid and palladium nitrate, when used in preparing the catalysts of the present invention.

Another method of preparing intimate admixture of alumina and stabilizing components is to coprecipitate all of the components, including the alumina, from aqueous solutions. Various methods of coprecipitation are suitable. Such methods include, for example, surface adsorption where one or more components in ionic form are sorbed on the surface of a precipitating solid; and inclusion, in which the coprecipitated compound or compounds have dimensions and a chemical composition which will fit into the crystal structure of a precipitating solid without causing appreciable distortion.

In coprecipitation, a suitable precipitant, usually a base, is added to the aqueous solution. Preferably the precipitant is selected such that undesirable or unnecessary compounds are volatilizable and decomposable upon calcination at 850° C. or above, or removable by washing or extraction. The precipitant is capable of initiating and completing essentially simultaneous coprecipitation of the components. Suitable precipitants are ammonium compounds such as ammonium hydroxide or ammonium carbonate as well as other hydroxides and carbonates of the alkali metals.

The precipitant may be in dilute or concentrated aqueous solution. The rapidity of addition of the precipitant and the degree of agitation used will vary depending upon the precipitate desired. Dilute precipitant solutions, slow addition, and vigorous agitation generally favor a coarser precipitate. The temperature during the addition of precipitant may be from about 0° to 90° C. Higher temperatures generally produce a coarser precipitate. The precipitant is added until a pH of about 5 to 8.5 is reached. At this time the coprecipitated mixture is recovered from the slurry, washed if desired, and digested or recrystallized if desired.

The platinum group metal may be precipitated from solution, for example, as a sulfide by contact with hydrogen sulfide. The platinum group metal may be present in the catalysts in elemental or combined forms, e.g., as an oxide, sulfide, or the like, subject to the above limitations. During subsequent calcination or use essentially all of the metal may be converted to the elemental form. Generally, when in elemental form the metal or metal crystallite is of very fine particle size, preferably less than about 50 Angstrom units to insure high activity and proper dispersion. The amounts of these metals are considered herein on the basis of the metal content regardless of their form.

The catalysts of this invention contain catalytically-active forms of alumina and rare earth metal oxide. The aluminas include gamma, eta, kappa, and delta aluminas, as distinguished from relatively inactive alpha alumina. The amounts of each of alumina and rare earth metal oxide in the catalysts are sufficient to provide a catalytic effect. Generally, the rare earth metal oxide if used alone will not provide sufficient surface area to show catalytic activity; thus a mixture with alumina is required. The use of the rare earth metal oxide in the indicated amounts provides stability to the alumina as well as catalytic activity for certain reactions. The amount of alumina is generally about 70 to 99 weight percent of the combined alumina rare earth oxide composite preferably about 80 to 98 weight percent. The amount of rare earth metal oxide is about 1 to 30 weight percent, preferably about 1 to 20 weight percent, based on the composite weight. Among the rare earth metal oxides which may be employed in the catalyst are those of cerium, lanthanum, samarium, praseodymium, and the like, as well as commercially available mixtures of rare earths. The rare earth oxide is preferably cerium oxide, or ceria. If a mixture of rare earths is used, the mixture is preferably one in which cerium oxide is the predominant component. The catalysts may also contain minor amounts of other ingredients which may or may not serve as promoters for oxidation and reduction reactions, e.g., manganese, vanadium, copper, iron, cobalt, chromium, nickel, and the like. Such promoters include the various metal oxides and other compounds of the metals.

During the pre-calcination of the rare earth metal oxide and alumina at temperatures of at least about 750° C., these oxides are preferably in intimate admixture and excessive sintering of the alumina does not occur, but rather a catalytically-active product is obtained. The calcined mixture of finely divided alumina and rare earth metal oxide can be made by calcining a mixture of compounds of rare earth metal and aluminum. These compounds decompose to the corresponding aluminum and rare earth metal oxides as calcination proceeds. Such compounds are precursors of the oxides and may be inorganic in nature such as oxygen-containing salts, such as nitrates, chlorides, phosphates, oxalates, and the like. These salts may be soluble in water. Preferably, an aqueous solution of a rare earth metal salt is mixed with finely divided alumina in hydrated or catalytically-active form, and the composite is calcined to provide the mixed oxides. These mixed oxides then may be used as a catalytically-active slip on a substantially catalytically-inert substrate or they may be pelleted or extruded in a conventional manner. The rare earth metal component may also be composited with the alumina to obtain an intimate admixture of these materials by combining an aqueous solution of the rare earth metal component with macrosize alumina, e.g., alumina spheres. The composition is then calcined to provide a stabilized outer portion of the macrosize alumina with the calcined rare earth metal oxide-alumina mixture.

Suitable pre-calcination conditions include temperatures of at least about 750° C., preferably about 900° to 1200° C. The conditions of the calcination are such as to provide catalytically-active solids having a relatively high surface area, e.g., at least about 25, preferably at least about 75, square meters per gram (s.m.p.g.). This calcination is conducted while the alumina and rare earth metal oxide are unsupported and in free-flowing condition, for economic reasons and to insure a good admixture which prevents undue sintering of the alumina. However, the calcination may be accomplished after the mixture is placed on a support if this be desired, but such calcination is less desirable.

Pre-calcination at a temperature of at least about 750° C. is preferable in the present invention. It is found that an intimate mixture of the rare earth metal component and the aluminum component is stable when calcined at such temperatures before any further preparative steps are performed. The addition of the rare earth component to the aluminum component and calcination is thought to stabilize the alumina and to prevent the transition of the alumina from an active to an inactive form. The temperature of about 750° C. will convert oxygen containing salts such as nitrates to their respective oxides, and since both aluminum and rare earth components will be intimately mixed, the concurrent heating in close association substantially reduces undesirable alumina transitions. Additionally, this pre-calcination before deposit on a substrate promotes adhesion of the calcined composite to the substrate thus allowing the use of higher space velocities with the finished catalyst with less chance of erosion. Further, such pre-calcination substantially reduces possible reactions of the uncalcined rare earth metal and aluminum components with the substrate. Such a reaction between the unstabilized alumina and the substrate promotes the formation of inactive forms of alumina thus reducing its activity. If the rare earth component were to react, it would reduce the effective amount of this component available to stabilize the alumina. A further advantage of such pre-calcination is economic because less heat in smaller furnaces is required to calcine the powder before it is placed on an inert support or before it is formed into pellets. In any event it is essential that this calcination is conducted before the addition of the platinum group metal component.

In one manner of preparing the catalysts of this invention, an aqueous slurry of the essentially water insoluble calcined mixture of alumina and rare earth metal oxide is contacted with a relatively catalytically-inert support. The solid content of the slurry forms a deposit on the support, and the resulting composite is dried and calcined for a second time at a temparature which provides a catalytically-active product. The second drying and calcination take place at a temperature low enough to prevent undue sintering of the mixture. Suitable calcination temperatures are generally about 300°, to 700° C. to insure catalytic activity without undue sintering, preferably about 400°–600° C. After this second calcination, the coating on the support has a surface area of at least about 25 s.m.p.g., preferably at least about 75 s.m.p.g. Lower temperatures can be employed to dry the composite if the second calcination is not performed.

After the coated support is dried and calcined, a platinum group metal component is added to enhance the catalytic activity of the composition. The platinum group metal may be added to the coated support in any desirable manner from aqueous or organic solutions of a platinum group metal compound or complex of from a slurry of the metal itself as previously described. Generally, this addition is made from an aqueous or other solution to impregnate or deposit the platinum group metal component on the coated support. For example, the platinum group metal may be added as chloroplatinic acid, or a mixture of chloroplatinic acid and palladium nitrate or such metal may be deposited on the coated support in other ionic forms. If desired, the platinum group metal can be precipitated from solution, for instance, in the form of sulfide by contact with hydrogen sulfide. During subsequent calcination or use, the platinum group metal in such material may be converted to elemental form. Preferably, the elemental metal or metal crystallite is in very fine particle size, of less than about 50 Angstrom units to insure high activity and proper dispersion.

After addition of the platinum group metal material, the catalyst is dried, and if desired, it may be calcined for a third time under conditions which provide a composition having characteristcs that enhance selected oxidation and reduction reactions. This final calcination stabilizes the completed catalyst so that during the initial stages of use, the activity of the catalyst is not materially altered. This third calcination may be conducted at temperatures of about 300° to about 700° C., preferably about 400°–600° C. This final calcination temperature must be low enough to prevent substantial sintering of the underlying coating which would cause substantial occlusion of the platinum group metal component.

An alternative method of making the catalysts of this invention if a relatively inert support is used, involves adding the platinum group metal component to the calcined mixture containing the rare earth metal and aluminum oxides before the latter are deposited on the support. For example, an aqueous slurry of the calcined mixture of oxides can be prepared and the platinum group metal component added to the slurry and mixed intimately therewith. The platinum group metal component can be in the forms described above and may be precipitated as previously described. The mixture containing the platinum group metal may be dried and calcined to provide a material containing the platinum group metal, rare earth metal oxide, and aluminum oxide in a form suitable for deposition on the relatively inert catalyst support or for use without such deposition as a catalyst in either finely divided or macrosize forms. The calcination may be conducted as described above. The calcined material generally has a surface area of at least about 25 s.m.p.g., preferably at least about 75 s.m.p.g. The coated support can also be dried and, if desired, calcined in a manner similar to the procedures described above.

While it is not essential, the comositions of this invention preferably have a relatively catalytically-inert support. The supports which can be employed in this invention are preferably unitary, skeletal structures of relatively large size, e.g., honeycombs. However, smaller particle forms may be used, e.g., pellets. This latter form of supported catalyst can be termed macrosized since its size is significantly greater than that of catalysts of the finely-divided type, for instance, those employed in fluidized reaction systems. The particle size of the supported macrosized catalysts of this invention is about 1/64 to ½ inch, preferably 1/32 to ¼ inch, in diameter; and their lengths are about 1/64 to 1 inch, preferably about 1/32 to ¼ inch. The size of these pellets can be altered depending upon proper design of the system in which they are to be used.

When a support is used, the calcined composite is generally a minor amount of the total catalyst structure and present in sufficient amount to provide a catalytic effect, e.g., about 2 to 30 weight %, preferably about 5 to 20 weight %, based on the total weight of the composite and support. The amount used depends on economics, size limitations, and design characterstics.

The preferred supports for certain high temperature oxidations are of the unitary type and have a unitary or monolithic, rigid refractory skeletal structure having gas flow channels extending therethrough. The skeletal structure may have a cylindrical cross-section and can have interior and superficial pores and/or perforations communicating with the channels.

These unitary supports are characterized by having a plurality of flow channels or paths extending therethrough in the general direction of gas flow. During use for oxidation of carbonaceous fuels, the catalyst is typically disposed in a vessel so that its structure occupies the major part of the cross-sectional area of the vessel. Advantageously, the structure has the general shape of the reaction vessel for which it is designed; and when prepared, the catalyst composition supported on such a structure can be placed therein with the channels extending in the general direction of gas flow between an inlet and outlet.

These supports whether of the unitary-skeletal type or pellets are preferably constructed of a substantially chemically and relatively catalytically-inert, rigid material capable of maintaining its shape and strength at high temperatures, for example, up to about 1800° C. The support typically has a low thermal coefficient of expansion, good thermal shock resistance, and low thermal conductivity. While a support having a porous surface is preferred, the surface may be relatively nonporous; but in such event it is desirable to roughen the surface to improve adhesion of deposited compositions.

The support may be metallic or ceramic in nature or a combination thereof. The preferred supports, whether in skeletal or other form, are composed primarily of refractory metal oxide including combined oxide forms, e.g., aluminosilicates. Suitable support materials include cordierite, cordierite-alpha alumina, silicon nitride, silicon carbide, zircon-mullite, spodumene, alumina-silica-magnesia, and zirconium silicate. Examples of other suitable refractory ceramic materials are sillimanite, magnesium silicates, zircon, petalite, alpha-alumina, and aluminosilicates. Although the support may be a glass ceramic, it is preferably unglazed and may be essentially entirely crystalline in form and marked by the absence of any significant amount of glassy or amorphous matrices. Further, the structure may have considerable accessible porosity, preferably having a water pore volume of at least about 10 percent. Such supports are described in U.S. Pat. No. 3,565,830, herein incorporated by reference.

The geometric, superficial, or apparent surface area of the skeletal type supports, including the walls of the gas flow channels is generally about 0.5 to 6, and preferably 1 to 5 square meters per liter of support. This surface area is sufficient for deposition of a satisfactory quantity of the composite or the finished catalyst composition. The plurality of channels, about 100 to 2500, preferably 150 to 500 per square inch of cross-sectional area, may be distributed across the entire face of the structure and frequently they define an open area in excess of 60% of the total area of the support. The channels generally extend through the support and are preferably separated by thin walls. The walls must be thick enough to provide rigidity and integrity to the structure while maintaining good apparent surface area. The wall thickness is thus in the range of about 2 to 25 mils. The flow channels can be of any shape and size consistent with the desired superficial surface area and should be large enough to permit relatively free passage of the gaseous mixture undergoing reaction; preferably the length of the channels is at least about 0.1 inch to insure sufficient contact or residence time to cause the desired reaction. Although the channels are generally parallel, they may be multi-directional and may communicate with one or more adjacent channels.

The catalysts of this invention can be used for selected reduction and oxidation reactions. In a typical oxidation they can be employed to promote the reaction of various chemical feedstocks by contacting the feedstock or compound with the catalyst in the presence of free oxygen preferably molecular oxygen. Although some oxidation reactions may occur at relatively low temperatures, many are conducted at elevated temperatures of about 150° to 900° C., and generally, these reactions occur with the feedstock in the vapor phase. The feeds generally are materials which are subject to oxidation and contain carbon, and may, therefore, be termed carbonaceous, whether they are organic or inorganic in character. The catalysts of this invention are particularly useful in promoting the oxidation of hydrocarbons, oxygen-containing organic components, for example, aldehydes, organic acids, and other intermediate products of combustion, such as carbon monoxide, and the like. These materials are frequently present in exhaust gases from the combustion of carbonaceous fuels, and thus the catalysts of the present invention are particularly useful in promoting the oxidation of such materials thereby purifying the exhaust gases. Such oxidation can be accomplished by contacting the gas stream with the catalyst and molecular or free oxygen. The oxygen may be present in the gas stream as part of the effluent, or may be added as air or in some other desired form having a greater or lesser oxygen concentration. The products from such oxidation contain a greater weight ratio of oxygen to carbon than in the material subjected to oxidation and in the case of exhaust purification these final oxidation products are much less harmful than the partially oxidized materials. Many such reaction systems are known in the art.

In a typical reduction reaction these catalyst compositions may be used in pollution abatement systems foor nitrogen oxide containing gas streams. When used in this manner, the catalysts exhibit high efficiency, low operating costs, and long operating periods between catalyst changes.

For example, in a reducing process utilizing these catalysts, a gas containing one or more nitrogen oxides and a reducing fuel is contacted with the catalyst. Generally, the gases contacted with the catalyst contain a minor amount of nitrogen oxides, e.g., about 0.01 to 0.3 volume percent in the case of waste gases, and a sufficient amount of reducing fuel to significantly reduce the amount of nitrogen oxides in the gas. The reducing fuel may be in the nitrogen oxide-containing gas or may be added from an extraneous source. The amount of reducing fuel present is usually in excess based on reduction of all of the nitrogen oxides to nitrogen and elimination of all of the oxygen. The fuels are of the types previously mentioned and thus may be carbon or hydrogen-containing materials which themselves undergo oxidation in the reaction system to produce carbon oxides, e.g., $CO_2$, or water. The feed gas may contain molecular oxygen among other materials, but the overall system is reducing in nature.

The reduction of the nitrogen oxides in accordance with this invention occurs at elevated temperatures. Thus the gas containing the fuel contacts the catalyst at temperatures sufficient to give the desired reduction, and such temperatures are often about 100° to 700° C., preferably about 400° to 550° C. Suitable space velocities employed in the system include, for instance, about 30,000 to 150,000 volumes of gas per volume of catalyst per hour. The choices of temperature and space velocity can depend on the particular reaction system involved and may vary considerably, as known in the art. For example, with hydrogen used as the fuel, relatively low reaction temperatures may be suitable, e.g., in the range of about 100° to 200 C., while with methane as the fuel, the temperature may more desirably be of the order of about 300° to 600° C. Pressures during these operations may also vary and may be, for example, from atmospheric to about 200 p.s.i.g. Such reducing systems are described in U.S. Pat. Nos. 2,970,034; 3,118,727; 3,125,408; and 3,425,803, among others.

The present invention will be illustrated further by the following examples. All parts and percentages in the specification and appended claims are by weight unless otherwise indicated.

EXAMPLE I

A stabilized $CeO_2$-$Al_2O_3$ slip is prepared by dissolving 336 grams $Ce(NO_3)_3 \cdot 6H_2O$ in 1188 ml. $H_2O$ for a final volume of solution of about 1390 ml. 1200 grams of activated $Al_2O_3$ powder is stirred into the solution which is dried with constant agitation, transferred to a drying oven at 110° C., and dried for 17 hours. The dried solids are ground to less than 40 mesh and calcined at 1100° C. for 1 hour. 1000 grams of this calcined powder are mixed with 1000 ml. $H_2O$ and 20.1 ml. conc. $HNO_3$, and ball-milled for 17 hours at 68 RPM in a U.S. Stoneware 1-gallon mill jar. 1000 parts of the resulting slip are diluted with a solution of 3.3 parts conc. $HNO_3$ and 333 parts $H_2O$. A 3 cubic inch cordierite honeycomb having about 250 parallel gas passages per square inch of a cross-sectional area, is dipped into this diluted slip, blown with air, dried at 110° C. for 2 hours, and calcined at 500° C. for 2 hours. Approximately 13–14 wt. percent of total ceria and alumina adheres to the honeycomb. Platinum is added to the catalyst by the following procedure. To 1245 ml. of aqueous $K_2PtCl_4$ solution (containing 3.55 g. Pt), 3.05 g. of $NaHCO_3$ was added. 1.5 grams of $NaCO_2H$ was added to the solution at 95° C. The ceria and alumina-coated honeycomb is immersed in this solution, washed Cl-free, dried at 110° C. for 2 hours, and calcined at 500° C. for 2 hours. The honeycomb, prepared as described, contains 0.40 weight percent Pt.

EXAMPLE II

The catalyst is prepared following the same procedure as in Example I except that platinum is deposited on the ceria and alumina-coated honeycomb by immersion in 500 ml. of aqueous $H_2PtCl_6$ (containing 2.41 g. Pt) for a few minutes and then treated with $H_2S$ for ¼ hour. After being washed chloride free and dried, the honeycomb is heated in an air atmosphere for about 1 hour to reach 500° and then maintained at 500° C. for 2 hours. The catalyst contains 0.2 weight percent Pt.

EXAMPLE III

A honeycomb, coated with a ceria-alumina slip is prepared as in Example I. The coated honeycomb is then dipped into a solution containing both $H_2PtCl_6$ and $Na_2PdCl_4$, concentrations of each being such that there is 8.8 g. Pt per 100 ml. of solution volume and 4.4 g. Pd per 100 ml. of solution volume. After standing for 10 minutes with intermittent raising and lowering of the honeycomb into the solution, the honeycomb is withdrawn from the solution and drained. The honeycomb is then treated with gaseous hydrogen sulfide for 15 minutes, and washed chloride-free using deionized water. The resulting impregnated honeycomb is dried overnight at 110° C., and calcined in flowing air for 2 hours at 500° C. The finished catalyst contains 0.21 weight percent Pt and 0.11 weight percent Pd. X-ray diffraction studies were made on the finished catalyst. These studies revealed a portion of platinum metal, a portion of palladium metal, and a portion of an alloy of platinum and palladium. It is thought that this portion of alloy results from the deposition as the temperature of calcination does not appear to be high enough to form a platinum-palladium alloy.

EXAMPLE IV

A ceria-alumina composite is prepared by dissolving 841 g. $Ce(NO_3)_3 \cdot 6H_2O$ in 2970 ml. $H_2O$ for a final volume of 3460 ml., and 3000 g. activated alumina powder is added to the solution. The slurry is dried with constant agitation, transferred to a drying oven at 100° C., and then dried for 16 hours. The dried solids are ground to less than 40 mesh, and calcined at 1100° C. for 2 hours. To 108 g. of this powder was added a solution of platinum tetramine hydroxide plus palladium tetramine hydroxide. The total solution volume was 151 ml., and it contained 2.75 g. Pt and 0.60 g. Pd. The wet powder was blended thoroughly, and dried for 2.5 hours at 110° C. The entire sample of powder, weighing 181 g., was transferred to a 1 qt. ball mill jar, 188 g. of balls was added plus 180 cc. $H_2O$ plus 3.6 cc. conc. $HNO_3$. The whole was then ball-milled for 16 hours at 60 RPM. The slurry was poured out, and then used to coat the same type of honeycomb as in Example I and by the same procedure. The catalyst so prepared, after calcination at 500° C., contained 0.18 weight percent Pt. and 0.04 weight percent Pd.

EXAMPLE V

A calcined ceria-alumina composite is prepared as in Example IV, then calcined at 1100° C. The powder is ball-milled with a solution of $(NH_4)_2Pt(SCN)_6$, then used for dipping honeycomb as in Example I. The dipped honeycomb is dried and then calcined at 500° C. The calcined catalyst contains 0.28 weight percent Pt.

EXAMPLE VI

To illustrate that the catalysts of this invention have improved properties for promoting the oxidation of exhaust gas, catalysts made essentially in accordance with the procedures of Examples I and IV were tested. In the test procedure a gas was passed in contact with the catalyst at a 40,000 volume hourly space velocity at various temperatures. The gas contained 3.0% oxygen, 1.0% carbon monoxide, 300 ppm. ethylene, 10.0% carbon dioxide, 500 ppm. nitric oxide, and the remainder, nitrogen. The gas was preheated upstream of the catalyst to raise the catalyst temperature to a given level and the gaseous effluent at each temperature tested was analyzed for carbon monoxide and ethylene contents. These values were plotted against the oxidation temperature as measured about ¼ inch upstream of the catalyst. From a plot of oxidation temperature against the amounts of carbon monoxide and ethylene in the effluent, the temperatures for 50% conversion of carbon monoxide to carbon dioxide and for 50% conversion of ethylene to carbon dioxide and water were determined. These values are reported in Table I below, along with the test results obtained using a similar catalyst in which no deria was included.

Table I

| | Oxidation System | | | |
|---|---|---|---|---|
| Slip Composition | Wt. % Slip on Honeycomb | Platinum Group Metal, Wt. % | Temp. for 50 % Conversion, ° C. | |
| | | | CO | $C_2H_4$ |
| 1. 100% $Al_2O_3$ | 12.0 | 0.20 Pt | 275 | 275 |
| 2. 25% Ceria/75% $Al_2O_3$ | 12.6 | 0.26 Pt | 215 | 250 |
| 3. 10% Ceria/90% $Al_2O_3$ | 13.1 | 0.17 Pt + .04 Pd | 175 | 190 |

These results show that the catalysts of this invention (Catalysts No. 2 and 3) are more active than a similar catalyst having only alumina as the coating on the support (Catalyst No. 1).

EXAMPLE VII 5000 grams of activated alumina spheres having a diameter of 0.10 inch are dipped in a solution of 1401 g. $Ce(NO_3)_3·6H_2O$ in 5050 ml. $H_2O$. After drying 16 hours at 110° C., the spheres were calcined for 2 hours at 1000° C. in air. After cooling 3500 g. of the spheres were sprayed with a solution containing 3.003 g. Pt (as the tetramine hydroxide) plus 1.517 g. Pd (as the tetramine hydroxide) in a volume of 1400 ml. The coated spheres were dried 16 hours at 110° C., then calcined 2 hours at 500° C. in air. The final catalyst contained 0.087 weight percent Pt + 0.043 weight percent Pd + 10 weight percent $CeO_2$ on alumina.

The performance of the catalyst was evaluated in the U.S. Government CVS 1975 cold start automobile exhaust test. The results showed emissions of 0.12 g. of hydrocarbon per vehicle mile and 1.3 g. of CO per vehicle mile.

EXAMPLE VIII

Alumina spheres were impregnated with cerous nitrate solution, dried and calcined as in Example VII. 3500 grams of the cooled spheres were sprayed with a solution of platinum tetramine hydroxide (4.550 g. Pt — total solution volume — 1400 ml.), then dried and calcined as in Example VII. The final catalyst contained 0.13 weight percent Pt + 10 weight percent $CeO_2$ on alumina.

The performance of the catalyst was evaluated in the U.S. Government CVS 1975 cold start automobile exhaust test. The results showed emissions of 0.14 g. of hydrocarbon per vehicle mile and 0.7 g. of CO per vehicle mile.

EXAMPLE IX

To illustrate the reduction system of the present invention, several catalysts were subjected to aging in a tail gas reduction system. The catalyst of the present invention, Catalyst A, below, was prepared by combining a cerous nitrate solution with activated alumina, extruding, drying at 110° C., spherizing to form spheres, calcining for 2 hours at 1000° C., coating the spheres with palladium by hydrolysis, and drying at 110° C. The resulting catalyst contained 0.38 weight percent palladium, 10 weight percent cerium oxide, and the balance essentially alumina. A commercially-available catalyst, Catalyst B, below, comprising platinum on alumina was used for comparative purposes.

In the tests, each catalyst sample was contacted in an ignition test system with a synthetically-prepared typical nitric acid production tail gas which contained 0.20 volume percent, NO, $NO_2$; 2.0 volume percent $O_2$; 95.4 volume percent $N_2$; 0.9 volume percent $H_2O$; and 1.50 volume percent methane added as reducing agent. The tail gas reducing fuel stream was heated before reaching the catalyst, and gas temperatures just upstream and downstream of the catalyst bed were measured. The preheat temperature was slowly raised until the point at which the downstream temperature exhibited a sudden increase. This preheat temperature is the ignition temperature and is one indication of catalyst activity, i.e., the lower the ignition temperature, the more active the catalyst. The catalyst was then removed and aged in the above gas mixture at 900° C. for varying times in an aging test system. After aging the catalyst was then placed in the ignition test system and again the ignition temperature was measured. This cycle was then repeated. Although gas purification may be accomplished at or above the ignition temperature, 900° C. was chosen in order to subject the samples to relatively severe thermal exposure. Some of the samples were used for 600 hours and the remaining for 1,150 hours. At the end of the aging period, oxides of nitrogen present in the effluent stream, and the ignition temperature of the catalyst were measured. The results are shown in Table II below.

TABLE II

| Catalyst | Reduction system | | | |
|---|---|---|---|---|
| | Aged 600 hrs. | | Aged 1,150 hrs. | |
| | Ignition Temp.-° C. | NO$_x$ in effluent | Ignition Temp.-° C. | NO$_x$ in effluent |
| A | 420 | 7 ppm | 425 | 7 ppm |
| B (comparative) | 550 | 1000 — 1200 ppm | 625 | 1207 ppm |

After 600 hours, at least 1000 ppm (parts per million) and after 1,150 hours, at least 1200 ppm of oxides of nitrogen remained in the effluent gases from Catalyst B, while only 7 ppm remained after 600 and 1,150 hours in the effluent gases from the process of the present invention using Catalyst A. Hence, the catalyst of the present invention exhibits superior catalytic effect and does so for longer periods of time.

This conclusion is supported by the ignition temperatures of the catalysts measured after 600 and 1,150 hours of aging. As mentioned above, ignition temperature is an indication of catalyst activity, i.e., the lower the ignition temperature, the more active the catalyst. Thus, an increase in ignition temperature indicates a decrease in catalytic activity or deactivation. The table above shows that after 600 hours of operation, Catalyst B had an ignition temperature of 550° C. while Catalyst A had an ignition temperature of only 420° C. After 1,150 hours, Catalyst B displayed a 625° C. ignition temperature, an increase of 75° C. This increase clearly indicates partial deactivation of the catalyst after 1,150 hours. Catalyst A, the catalyst of this invention, however, had an approximately constant ignition temperature in this system. At 1,150 hours, the ignition temperature had increased only 5° C., an indication of essentially negligible deactivation. Further, the length of time the catalysts were aged at 900° C. shows that the catalyst of the present invention retained its stability at high temperature.

It can be seen from the results that the present invention utilizes catalysts of excellent long-term activity and high temperature stability. These advantages will substantially reduce the frequency of catalyst changes and thereby reduce operating costs. Also in many waste gas reduction processes, effluent preheat costs may be reduced as a result of lower ignition temperatures. Such lower temperatures in turn decrease the thermal wear of apparatus used in the process, thereby reducing part replacement costs.

What is claimed is:

1. A composition consisting essentially of a relatively catalytically-inert, solid support having coated thereon a minor amount of a catalytically-active composite consisting essentially of a catalytically-effective amount of a platinum group metal selected from the group consisting of platinum, palladium, ruthenium, iridium and rhodium, added to an admixture of a rare earth metal oxide and alumina, said admixture containing alumina in an amount in the range of 70–99% by weight and selected from the group consisting of γ-alumina, η-alumina, κ-alumina and δ-alumina and containing a rare earth metal oxide in an amount in the range of 1–30% by weight and selected from the group consisting of cerium oxide, lanthanum oxide, samarium oxide and praseodymium oxide, said admixture having a relatively high surface area of at least about 75 m² per gram and having been derived from alumina or an aluminum compound and from said rare earth metal oxide or a compound of said rare earth metal which has been calcined at a temperature of at least 750° C. to yield said alumina and said rare earth metal oxide.

2. The composition of claim 1 wherein said rare earth metal oxide is ceria.

3. The composition of claim 1 wherein the calcining was at a temperature of about 900° to 1200° C.

4. A composition in accordance with claim 1 wherein said platinum group metal is incorporated in said calcined composite in an amount up to about 20% by weight of said composite.

5. A composition in accordance with claim 1 wherein said platinum group metal is a mixture of platinum metal and palladium metal and wherein platinum metal makes up about 50–95% by weight and palladium metal makes up about 5–50% by weight of said mixture.

* * * * *